United States Patent
Moradi et al.

(10) Patent No.: US 11,971,794 B2
(45) Date of Patent: Apr. 30, 2024

(54) NETWORK NODE, MONITORING NODE AND METHODS PERFORMED THEREIN

(71) Applicant: Telefonaktiebolaget LM Ericsson (publ), Stockholm (SE)

(72) Inventors: Farnaz Moradi, Stockholm (SE); Ramamurthy Badrinath, Bangalore (IN); Chunyan Fu, Pointe-Claire (CA); Leonid Mokrushin, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 255 days.

(21) Appl. No.: 16/759,663

(22) PCT Filed: Oct. 30, 2017

(86) PCT No.: PCT/SE2017/051062
§ 371 (c)(1),
(2) Date: Apr. 27, 2020

(87) PCT Pub. No.: WO2019/088885
PCT Pub. Date: May 9, 2019

(65) Prior Publication Data
US 2020/0293418 A1  Sep. 17, 2020

(51) Int. Cl.
*G06F 11/30* (2006.01)
*G06F 11/34* (2006.01)

(52) U.S. Cl.
CPC ........ *G06F 11/3006* (2013.01); *G06F 11/302* (2013.01); *G06F 11/3058* (2013.01);
(Continued)

(58) Field of Classification Search
CPC .. G06F 11/3006; G06F 11/3058; H04L 43/08; H04L 43/02; H04L 43/04; H04L 43/06; H04L 43/12; H04W 24/00
See application file for complete search history.

(56) References Cited

U.S. PATENT DOCUMENTS

| 9,712,410 B1 * | 7/2017 | Char | H04L 43/08 |
| 10,237,149 B1 * | 3/2019 | Guo | H04L 43/04 |

(Continued)

FOREIGN PATENT DOCUMENTS

| WO | WO-2016155816 A1 * | 10/2016 | G06F 11/30 |
| WO | WO-2017196216 A1 * | 11/2017 | G06F 9/45558 |
| WO | 2018124949 A1 | 7/2018 | |

OTHER PUBLICATIONS

Wolfgang et al. "Service Provider DevOps" IEEE Communications Magazine, vol. 55, No. 1, Jan. 2017, pp. 204-211.

(Continued)

*Primary Examiner* — Kostas J Katsikis
(74) *Attorney, Agent, or Firm* — Rothwell, Figg, Ernst & Manbeck, P.C.

(57) ABSTRACT

Embodiments herein relate to a method performed by a network node (10) for handling monitoring of applications and/or services in a communication network. The network node (10) obtains an indication associated with a monitoring session to monitor a metric of a service and/or application; and also obtains a location of deployment of the service and/or application. The network node identifies one or more ongoing monitoring sessions for monitoring one or more metrics based on the metric associated with the indication and the location of deployment of the application or service. The network node (10) then selects a monitoring process based on the identification; and triggers the selected monitoring process.

20 Claims, 8 Drawing Sheets

(52) U.S. Cl.
CPC ...... *G06F 11/3096* (2013.01); *G06F 11/3433* (2013.01); *G06F 11/3495* (2013.01); *G06F 2201/865* (2013.01)

(56) References Cited

U.S. PATENT DOCUMENTS

| | | | | |
|---|---|---|---|---|
| 10,291,488 | B1* | 5/2019 | Srinivasan | H04L 41/5096 |
| 10,367,705 | B1* | 7/2019 | Rodriguez | H04L 43/08 |
| 10,467,557 | B1* | 11/2019 | Kodesh | H04L 43/04 |
| 10,476,766 | B1* | 11/2019 | Rodriguez | H04L 43/08 |
| 10,558,541 | B1* | 2/2020 | Chakkassery Vidyadharan | G06F 11/3006 |
| 10,560,353 | B1* | 2/2020 | Stickle | H04L 67/34 |
| 10,623,285 | B1* | 4/2020 | Shevade | H04L 43/08 |
| 10,756,990 | B1* | 8/2020 | Chakkassery Vidyadharan | G06F 11/301 |
| 11,106,442 | B1* | 8/2021 | Hsiao | H04L 41/22 |
| 2006/0294439 | A1 | 12/2006 | Rolia et al. | |
| 2009/0111382 | A1 | 4/2009 | Yao | |
| 2009/0182866 | A1* | 7/2009 | Watanabe | G06F 11/3409 709/224 |
| 2013/0151692 | A1 | 6/2013 | White | |
| 2014/0006612 | A1* | 1/2014 | Fallon | H04L 43/091 709/224 |
| 2014/0136681 | A1* | 5/2014 | Greenlee | H04L 67/14 709/224 |
| 2015/0172148 | A1* | 6/2015 | Ishida | G06F 9/5072 709/224 |
| 2015/0333992 | A1* | 11/2015 | Vasseur | H04L 43/0876 370/252 |
| 2016/0105346 | A1* | 4/2016 | Pignataro | H04L 63/065 370/253 |
| 2017/0093995 | A1* | 3/2017 | Nitsan | G06F 11/3466 |
| 2017/0295082 | A1* | 10/2017 | Wu | G06F 8/38 |
| 2018/0285250 | A1* | 10/2018 | Helsley | G06F 11/3409 |
| 2019/0082286 | A1* | 3/2019 | Tata | H04W 4/38 |
| 2019/0245767 | A1* | 8/2019 | Di Girolamo | H04L 69/164 |
| 2020/0145307 | A1* | 5/2020 | Flinta | G06F 11/3495 |

OTHER PUBLICATIONS

International Search Report and the Written Opinion of the International Searching Authority, issued in corresponding International Application No. PCT/SE2017/051062, dated Sep. 7, 2018, 12 pages.

Marchetto et al. "Unifying Cloud and Carrier Networks, D4.3 Updated Concept and Evaluation Results for SP-DevOps" Unify, Version 1.2, Oct. 14, 2016, 141 pages.

Zhang et al. "HELM: Conflict-Free Active Measurement Scheduling for Shared Network Resource Management" 2015 IFIP/IEEE International Symposium on Integrated Network Management (IM2015), pp. 113-121.

Gangam et al. "Mitigating Interference in a Network Measurement Service" 2011, IEEE, pp. 1-9.

Guo et al. "Pingmesh: A Large-Scale System for Data Center Network Latency Measurement and Analysis" SIGCOMM '15, Aug. 17-21, 2015, London, United Kingdom, DOI: http://dx.doi.org/10.1145/2785956.2787496, pp. 139-152.

* cited by examiner

NETWORK NODE, MONITORING NODE AND METHODS PERFORMED THEREIN

CROSS REFERENCE TO RELATED APPLICATION(S)

This application is a 35 U.S.C. § 371 National Phase Entry Application from PCT/SE2017/051062, filed Oct. 30, 2017, designating the United States, the disclosure of which is incorporated herein by reference in its entirety.

TECHNICAL FIELD

Embodiments herein relate to a network node, a monitoring node and methods performed therein. Furthermore, a computer program and a computer readable storage medium are also provided herein. In particular, embodiments herein relate to handling monitoring in a communication network.

BACKGROUND

In a typical communication network, wireless devices, also known as wireless communication devices, mobile stations, stations (STA) and/or user equipments (UE), communicate via e.g. a Radio Access Network (RAN) to one or more core networks (CN). The RAN covers a geographical area and provide radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a "NodeB" or "eNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network also referred to as New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In the field of cloud-implemented services, resources for processing, storing and communication of data are basically hired and used temporarily for execution of a cloud service in a communication network. Cloud-implemented services represent any service that is executed for a client by means of processing and storage resources in a data centre which is typically selected to provide efficient and reliable processing and communication of the service data over the communication network. The communication network discussed herein may be any type of network, e.g. a wireless, fixed, public and/or private network, using any protocols and standards for communication.

Continuous monitoring in cloud-implemented services is critical for identifying and diagnosing performance problems. Monitoring methods consume compute and network resources and if the resources used for monitoring are not managed properly, the monitoring methods can affect the performance of applications/services. Therefore, it is important to limit and control the amount of resources being used for monitoring.

Additionally, running multiple monitoring sessions at the same time can lead to monitoring conflicts and interference. Monitoring conflicts can result in faulty monitoring results. For example, in 'Large-Scale Available Bandwidth Measurements: Interference in Current Techniques' D Croce et al. Published in IEEE Transactions on Network and Service Management; Volume: 8, Issue: 4, December 2011, it is shown that overlapping links of measurement paths may bias metric estimation due to interference in the communication network. That is, a packet transmission for estimating e.g. a throughput may affect another monitoring session over the same link.

A variety of studies have considered the scheduling problem of active measurement tasks to prevent measurement conflicts while satisfying the measurement requirements. Examples include "HELM: Conflict-free active measurement scheduling for shared network resource management" Miao Zhang et al. 2015 IFIP/IEEE International Symposium on Integrated Network Management (IM) and "Mitigating interference in a network measurement service" Sriharsha Gangam et al 2011 IEEE 19th International Workshop on Quality of Service (IWQoS), where measurement tasks are scheduled to reduce the interference.

Another example is "PingMesh: A Large-Scale System for Data Center Network Latency Measurement and Analysis" Chuanxiong Guo et al, SIGCOMM '15, Aug. 17-21, 2015, London, United Kingdom, which uses a centralized scheduler to schedule latency measurements between servers in a datacenter or between datacenters with an objective to achieve full coverage of the network.

In cloud environments where virtualized application instances may be started, stopped, and moved dynamically, the monitoring should keep up with the dynamic nature of applications. A party or a requesting party such as a user or applications, which require monitoring between devices providing the service(s) have no information about the deployment of their services, nor do the users know if their requested monitoring sessions conflict with each other or if the monitoring sessions requested by other users are sharing the same infrastructure. The services or application may be deployed in devices such as virtual machines (VM) or virtual containers.

Therefore, monitoring sessions started by different users and applications and between different devices can overlap with each other, i.e. use same links, and cause monitoring conflicts.

There is a need for a monitoring system to avoid interference between monitoring sessions and to respect the constraints on resources that can be used for monitoring, while satisfying the monitoring requirements of the requesting party. A monitoring system receiving different monitoring intents for different services should be able to schedule the measurements dynamically to avoid the conflicts while satisfying the intents and respecting the resource limits for monitoring. Existing solutions only focus on scheduling requested monitoring tasks for example to avoid interference resulting in a rather rigid and non-flexible solution.

SUMMARY

An object herein is to provide a mechanism that improves monitoring of applications and/or services in an efficient manner.

According to an aspect the object is achieved by providing a method performed by a network node for handling monitoring of applications and/or services in a communication network. The network node obtains an indication, such as a monitoring request or a stop request, associated with a monitoring session to monitor a metric, e.g. throughput, of a service and/or application. Furthermore, the network node obtains a location of deployment of the service and/or application, e.g. coordinates of a device hosting the service or application. The network node identifies one or more ongoing monitoring sessions for monitoring one or more metrics based on the metric associated with the indication and the location of deployment of the application or service. The network node further selects a monitoring process e.g. a monitoring configuration or reconfiguration, based on the identification; and triggers the selected monitoring process, e.g. transmitting, to a monitoring node, scheduling of packets.

According to another aspect the object is achieved by providing a method performed by a monitoring node for handling monitoring of applications and/or services in a communication network. The monitoring node transmits, to a network node, an indication associated with a monitoring session to monitor a metric of a service and/or application. The monitoring node receives, from the network node, data indicating scheduling, in frequency and/or phase, for performing one or more measurements, and further receives, from the network node, reconfiguration data for performing one or more measurements. The monitoring node then reconfigures itself based on the received reconfiguration data.

It is furthermore provided herein a computer program comprising instructions, which, when executed on at least one processor, cause the at least one processor to carry out any of the methods above, as performed by the network node. It is additionally provided herein a computer-readable storage medium, having stored thereon a computer program comprising instructions which, when executed on at least one processor, cause the at least one processor to carry out the method according to any of the methods above, as performed by the network node.

According to yet another aspect a network node for handling monitoring of applications and/or services in a communication network is herein provided. The network node is configured to obtain an indication associated with a monitoring session to monitor a metric of a service and/or application; and to obtain a location of deployment of the service and/or application. The network node is further configured to identify one or more ongoing monitoring sessions for monitoring one or more metrics based on the metric associated with the indication and the location of deployment of the application or service. The network node is configured to select a monitoring process based on the identification, and to trigger the selected monitoring process.

According to still another aspect a monitoring node for handling monitoring of applications and/or services in a communication network is herein provided. The monitoring node is configured to transmit, to a network node, an indication associated with a monitoring session to monitor a metric of a service and/or application. The monitoring node is further configured to receive, from the network node, data indicating scheduling, in frequency and/or phase, for performing one or more measurements. The monitoring node is configured to receive, from the network node, reconfiguration data for performing one or more measurements; and to reconfigure the monitoring node based on the received reconfiguration data.

According to embodiments herein it is herein provided a method for dynamic and adaptive configuration of monitoring functions based on indications, such as monitoring requests, from devices and provisions of monitoring results so that the overall overhead of monitoring may not exceed the resource limits for monitoring. The method is performed by a network node which receives indications from devices/service descriptions and keeps a view of the requested and ongoing monitoring sessions. Furthermore, whenever there is a change in the monitoring requests, e.g., new monitoring request or migration of service components, the network node identifies identical monitoring sessions, sets up or defines a new or updated monitoring schedule, updates e.g. the request descriptions, and/or (re-)configure the monitoring functions. This results in an efficient use of resources for monitoring services or application and improves monitoring of the applications and/or services in an efficient manner.

BRIEF DESCRIPTION OF THE DRAWINGS

Embodiments will now be described in more detail in relation to the enclosed drawings, in which.

DETAILED DESCRIPTION

Figure 1:
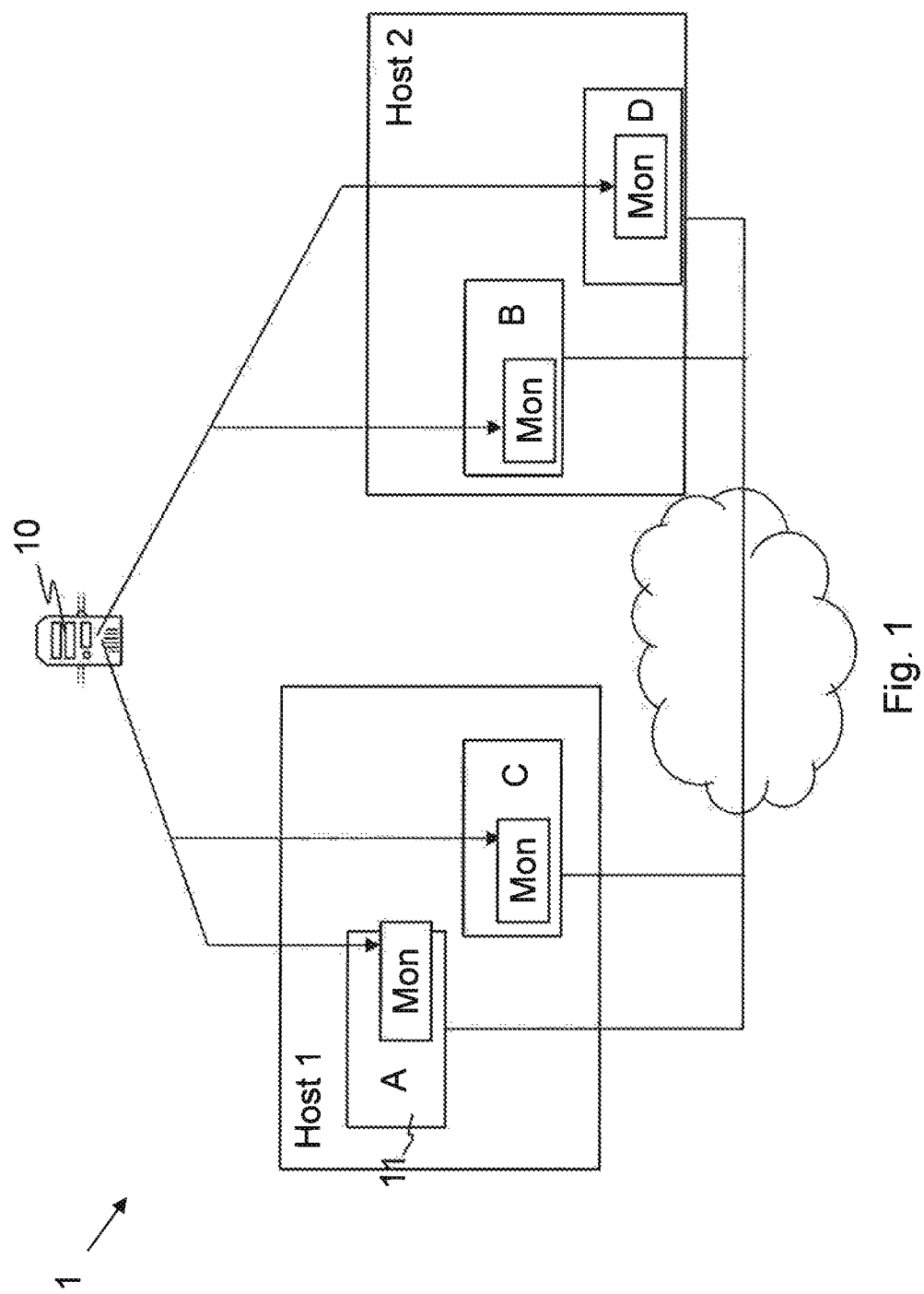
FIG. 1 is a schematic diagram depicting a communication network according to embodiments herein.

Embodiments herein relate to communication networks in general. FIG. 1 is a schematic overview depicting a communication network 1. The communication network 1 comprises e.g. one or more RANs and one or more CNs. The communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a cloud computing environment, however, embodiments are also applicable in further development of the existing communication networks such as e.g. WCDMA and LTE. Cloud computing environment meaning that application instances and/or resources are distributed handled in the communication network.

In the communication network 1, a network node 10, such as a server, a monitoring server, an Operations And Maintenance (OAM) node, a computer or similar, monitors, in a centralized manner, services or applications provided in the communication network 1. The communication network further comprises devices A,B,C,D using or monitoring the applications or services in the communication network. The devices may comprise VM or containers of different hosts such as Host 1 and Host 2. Each device comprises a monitoring function and may be denoted as a monitoring node 11.

In a (multi-tenant) cloud environment a monitoring system, such as the network node 10, can provide monitoring functionality for all devices. The goal is to perform the requested monitoring for different devices or users of devices while limiting the requested monitoring overhead and satisfying monitoring requests by distributing monitoring between them. The network node 10 identifies monitoring sessions that are identical and may automatically (re)configure the corresponding monitoring functions. Embodiments herein may dynamically adapt the monitoring by re-configuring one or more monitoring functions when e.g. services are started/stopped/moved. The dynamicity of monitoring configuration and scheduling, i.e. that monitoring configuration is adapted, allows minimization of impact of monitoring service on other services running in the cloud based environment. Devices "A", "B", "C", and "D" are illustrated as Virtual machines (VM)/containers and "Mon" are the monitoring functions being configured by the network node 10.

Upon receiving an indication associated with a monitoring session to monitor a metric of a service and/or application, the network node 10 coordinates the indication with existing monitoring sessions, and the network node 10 may then configure and start the required monitoring functions.

According to embodiments herein, the network node 10 takes into account the monitoring sessions for different services and identifies identical metrics and locations for e.g. measurements among all the services and/or applications. Identical measurements may be measurements that are performed between same entities on the same resources. For example, throughput or available path capacity between two physical servers measured from different devices can be considered identical if the devices are connected to a same virtual switch and their traffic traverses the same physical communication network. The information about placement or deployment of services or applications and network configuration can be obtained by the network node 10 from a cloud orchestrator.

Once the network node 10 identifies the identical monitoring sessions, the network node 10 may define a schedule for them, and may then configure the monitoring functions for each monitoring request. Additionally, the network node 10 may collect results of the measurements and may aggregate the results based on the original requests and reports the results or alarms according to the specified reactions.

Furthermore, if there is a change in deployment of the service or application or network configuration of the services or applications being monitored, the network node 10 may dynamically adapt the monitoring. For example, the network node 10 identifies that after migration of a device the monitoring tasks are not identical anymore, so the monitoring system will re-configure the monitoring functions so that the monitoring requests can be satisfied.

It should be understood by the skilled in the art that "device" is a non-limiting term which means any terminal, VM, Container, computer, part of a server, wireless communications terminal, user equipment, Machine Type Communication (MTC) device, Device to Device (D2D) terminal, or node e.g. smart phone, laptop, mobile phone, sensor, relay, mobile tablets, base station or similar.

Furthermore, it should be noted that the network node 10 may be implemented in a distributed manner in a cloud system.

Figure 2A:
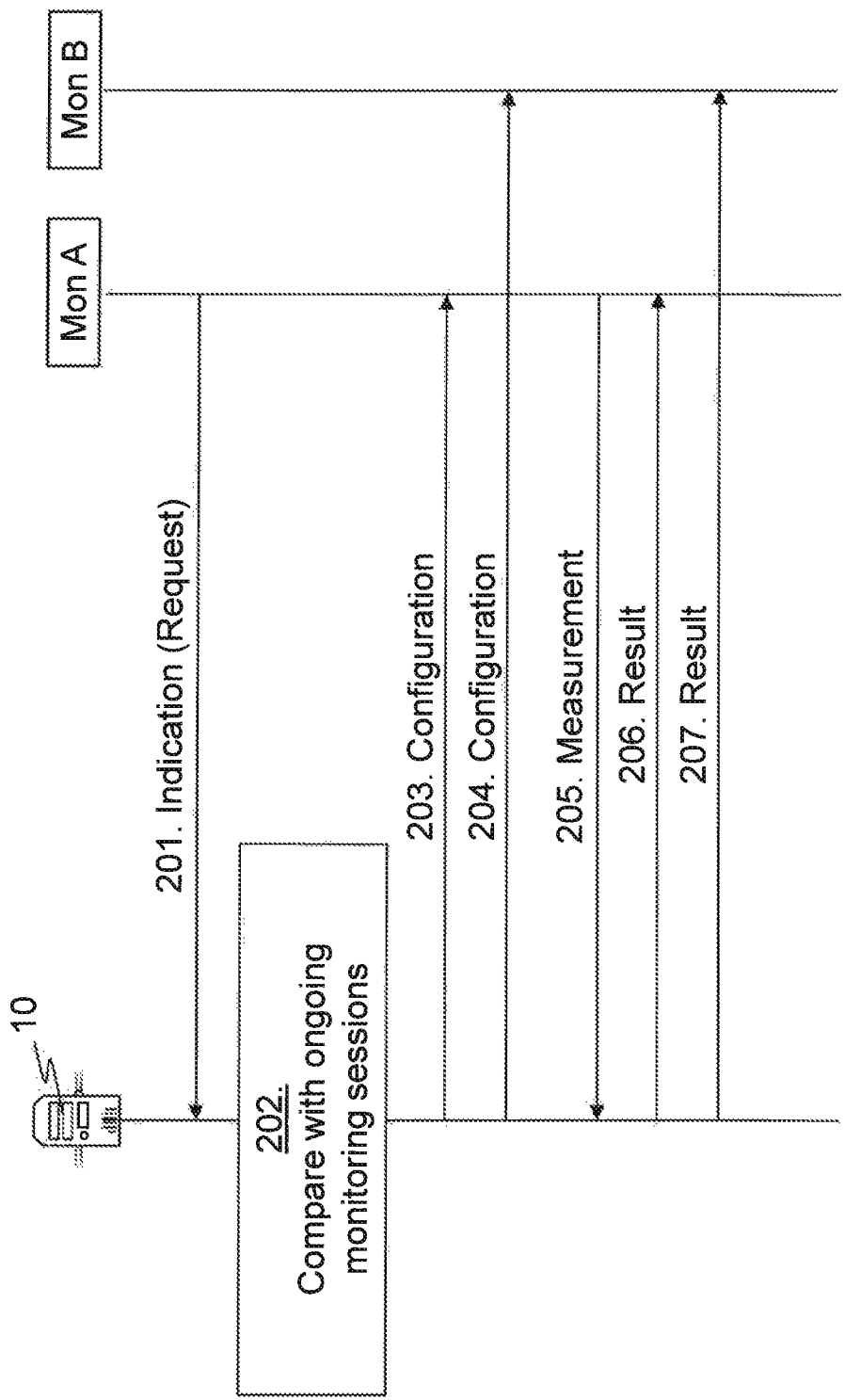
FIG. 2A shows a combined signalling scheme and flowchart according to embodiments herein.

A combined flowchart and signaling scheme depicting embodiments herein is shown in FIG. 2A. In the illustrated example, the indication associated with the monitoring session to monitor a metric of a service and/or application is a monitoring request.

Action 201. An application or a service or an agent associated with one or more applications sends an indication, such as a request, for monitoring. Thus, the network node 10 may receive, i.e. obtain, one or more monitoring requests from devices/service descriptions and keep a view of the requested and ongoing monitoring tasks. The network node 10 can receive these one or more monitoring requests either as part of service description or as separate monitoring requests after the deployment of the service or application. A monitoring request comprises a metric that needs to be monitored, along with where the metric is to be monitored and e.g. with what frequency it needs to be monitored. The intents can be defined using, for example, MEASURE annotations [1]. In the following MEASURE example, "measurement" defines "which measurement function to activate, and where the particular measurement should be taken, and how the measurement should be configured". The "zones" specify "how to aggregate measurement results" and "reactions" specify the triggers. In the example, the one-way latency between VMs/containers 'A' and 'B' need to be measured. The measurement should be taken in every 5 minutes and if the latency starts to be larger than 10.0, a "Warning latency" shall be issued.

```
measurement {
    m1 = oneway_latency(A, B, param);
    m2 = cpu_load(A);
}
zones {
    z1 = Avg(m1, '5 minutes') >= 10.0;
```

```
z2 = Avg(m1, '5 minutes') < 10.0;
z3 = Avg(m2, '1 minute') < 90%;
z4 = Avg(m2, '1 minute') >= 90%;
}
reaction {
z3->z4: Publish(topic=alarm, msg="Warning CPU");
z2->z1: Publish(topic=alarm, msg="Warning latency");
}
```

Action 202. Upon receiving the indication indicating a monitoring intent, the network node 10 coordinates the monitoring intent with the existing monitoring sessions. That is, the network node 10 may compare to ongoing monitoring sessions and identify similar or identical ongoing monitoring sessions. Similar or identical meaning that the monitoring sessions monitors same metric(s) and same location of deployment of the service/application.

Action 203. The network node may then configure and start the required monitoring functions of the monitoring nodes. The network node 10 may e.g. transmit configuration to the monitoring function of device A setting up measurement process for monitoring the metric.

Action 204. The network node may further configure other ongoing monitoring sessions. The network node 10 may e.g. transmit configuration to the monitoring function of device B releasing the measurement process for monitoring the metric, in case, the monitoring function of device A is enough for monitoring the metric also for device B. The configuration may also state scheduling of measurements in relation to the measurements performed by the monitoring function of device A such that resources are used in an efficient manner see FIG. 5.

Action 205. The monitoring function A may collect measurements and further transmit the measurements of the metric to the network node 10. It should be noted that the monitoring function may calculate the result itself and transmit the result to the network node for further distribution.

Action 206. The network node 10 may calculate result of the metric and then transmit the result to the monitoring function A.

Action 207. The network node 10 may further transmit the result of the metric to the monitoring function B e.g. in case the result of device A is enough for monitoring the metric also for device B.

Figure 2B:
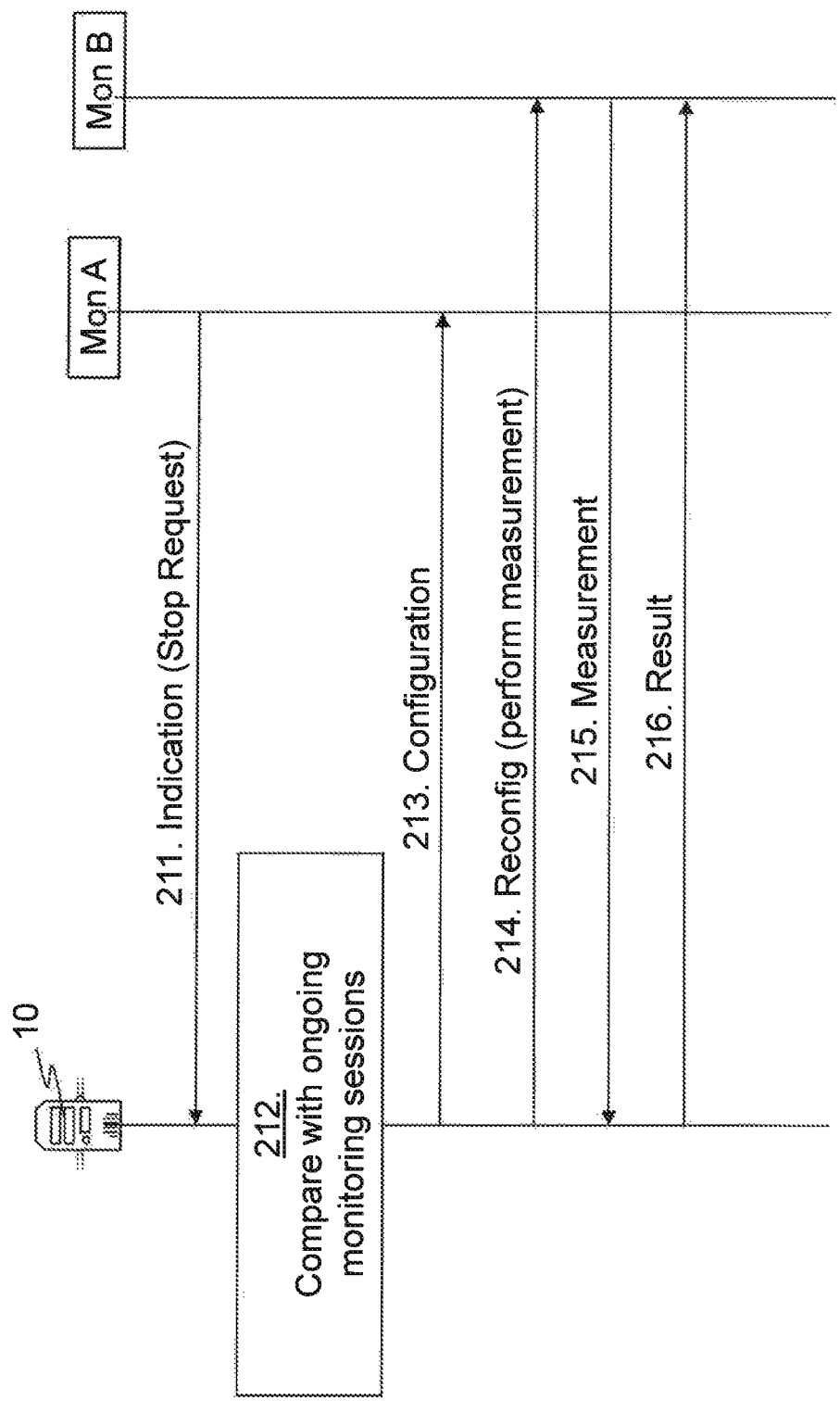
FIG. 2B shows a combined signalling scheme and flowchart according to embodiments herein.

A combined flowchart and signaling scheme depicting embodiments herein is additionally shown in FIG. 2B. In the illustrated example, the indication associated with the monitoring session to monitor a metric of a service and/or application is a stop request, indicating a stopping of a monitoring process of a monitoring function.

Action 211. An application or a service or an agent associated with one or more applications sends an indication, such as a stop request, for stopping the monitoring of a metric.

Action 212. Upon receiving the indication indicating the stopping of monitoring the metric, the network node 10 coordinates the monitoring processes with the existing monitoring sessions. That is, the network node 10 may compare to ongoing monitoring sessions and identify similar or identical ongoing monitoring sessions. Similar or identical meaning that the monitoring sessions monitors same metric(s) and same location of deployment of the service/application.

Action 213. The network node 10 may then configure and stop the required monitoring function. The network node 10 may transmit configuration to the monitoring function of device A stopping the measurement process for monitoring the metric.

Action 214. The network node 10 may further reconfigure other ongoing monitoring sessions. The network node 10 may e.g. transmit reconfiguration to the monitoring function of device B initiating and setting up the measurement process for monitoring the metric.

Action 215. The monitoring function B may collect measurements and further transmit the measurements of the metric to the network node 10. It should be noted that the monitoring function may calculate the result itself and transmit the result to the network node for further distribution.

Action 216. The network node 10 may calculate result of the metric and then transmit the result to the monitoring function B.

Interrupting

Figure 3:
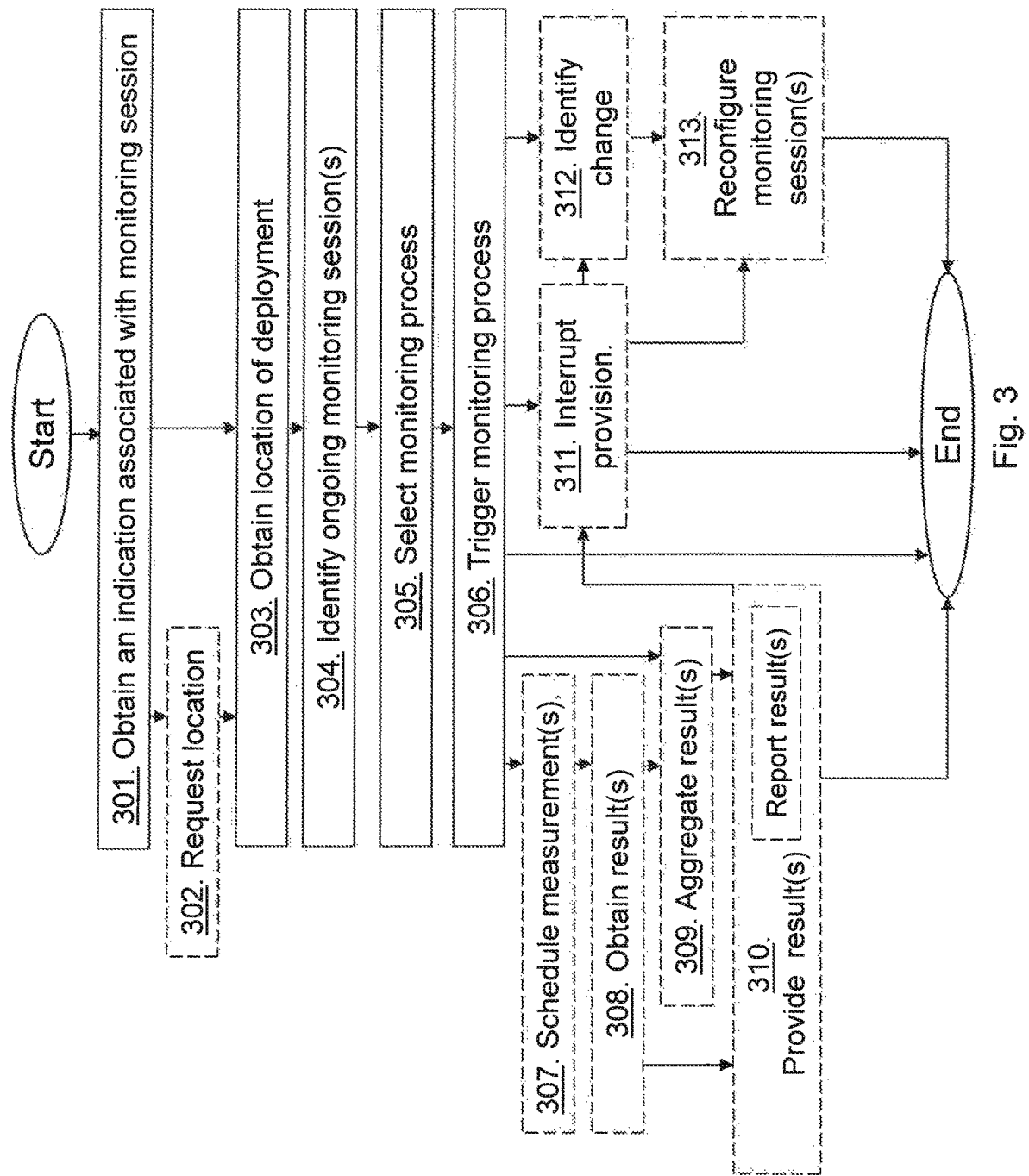
FIG. 3 shows a method performed by a network node according to embodiments herein.

The method actions performed by the network node 10 for handling monitoring of applications and/or services in the communication network 1 according to some embodiments will now be described with reference to a flowchart depicted in FIG. 3. The actions do not have to be taken in the order stated below, but may be taken in any suitable order. Actions performed in some embodiments are marked with dashed boxes.

Action 301. The network node 10 obtains the indication associated with a monitoring session to monitor a metric of a service and/or application. The metric may be e.g. throughput, available path capacity, delay, jitter, round trip time, application response time, or similar. That the indication is associated with the monitoring session means that the indication, whether it is a monitoring request, a stop request or a location reconfiguration, is a message relating to the service/application. If indications, such as monitoring intents, are specified as part of the service description, the network node 10 may obtain the indications from the service description when the application/service is being deployed in the communication network. The monitoring intents or policies, referred to herein as monitoring requests, for different services may thus be specified as part of service descriptions or can be obtained after the deployment of a service or application. The monitoring request specify the metric that needs to be measured, where it should be measured, and may also indicate with what frequency, for example using MEASURE annotations in G. Marchetto, R. Sisto, W. John et al., "Final Service Provider DevOps concept and evaluation," ArXiv e-prints, vol. 1610.02387, 2016. [Online]. MEASURE is defined as: "Machine-readable descriptions of the capabilities and their configuration parameters need to be developed. They specify which measurement functions should be activated, what and where they should measure, how they should be configured, how the measurement results should be aggregated, and what the reactions to the measurements should be". Based on the MEASURE annotations, a monitoring system can instantiate and configure the required monitoring functions, collect and aggregate the results, and generate alarms or triggers.

The indication may comprise the request for monitoring the metric of the service and/or application, a stop request requesting to stop monitoring the metric, or a location reconfiguration indicating a relocation of the service/application or the device at least partly running the service.

Action 302. The network node 10 may request the location of deployment of the application or service from a cloud orchestrator.

Action 303. The network node 10 obtains the location of deployment of the service and/or application. This may be retrieved internally or from an external node such as a cloud orchestrator. A cloud orchestrator is a node running software that manages the interconnections and interactions among cloud-based services and applications. The network node 10 may, additionally or alternatively, obtain information about the network setup e.g. network node architecture, and/or topology of the services or applications as well.

Action 304. The network node 10 identifies one or more ongoing monitoring sessions for monitoring one or more metrics based on the metric associated with the indication and the location of deployment of the application or service.

Action 305. The network node 10 selects a monitoring process based on the identification. The network node may select one or more monitoring processes i.e. for a plurality of monitoring functions or services/applications.

Action 306. The network node 10 then triggers the selected monitoring process, or at least one selected monitoring process.

Action 307. The network node 10 may, in some embodiments, schedule, in frequency and/or phase, one or more measurements of the identified one or more ongoing monitoring sessions taking resource limitations into account. For example, the network node may schedule measurements to be performed from a plurality of monitoring functions in a resource efficient manner, e.g. time multiplexed. Thus, the network node 10 may act as an arbitrator and calculate the frequency and phase for each overlapping monitoring session and (re-)configures the monitoring functions accordingly. The arbitration may be done to make sure that the overall monitoring overhead is reduced while satisfying the requested monitoring frequency and avoiding interference of measurements. The network node 10 may, thus, based on the received indication, reconfigure one or more monitoring sessions and send reconfiguration data to the monitoring node handling the one or more monitoring sessions.

Action 308. The network node 10 may then further obtain (collect) one or more results of the one or more measurements performed as scheduled. For example, the network node 10 may receive measurements performed as scheduled at one or more monitoring functions, and may then calculate the result of the metric based on the received measurement or measurements. Additionally or alternatively, the network node 10 may receive the results from one or more of the measurements i.e. the monitoring function may calculate the results and transmit back to the network node 10.

Action 309. The network node 10 may aggregate the one or more results e.g. from a plurality of monitoring sessions.

Action 310. The network node 10 may provide one or more results of the one or more ongoing monitoring sessions to a party, such as service or application, requesting the monitoring of the metric of the service and/or application. The network node 10 may e.g. report the obtained one or more results to the monitoring session and the identified one or more ongoing monitoring sessions. E.g. the network node 10 receives the monitoring results from different monitoring functions and may then aggregate the results and report the results with the requested frequency to the requesting parties. Another example of a requesting party may be the cloud orchestrator which cloud orchestrator use the monitoring data to make decisions such as scaling or migrating the application/service or VM/container. The results can also be shown to the operator/user/tenant via a dashboard.

Action 311. The network node 10 may interrupt provision of one or more results of the one or more ongoing monitoring sessions based on the stop request.

Action 312. The network node 10 may identify a change in a monitoring session. e.g. by receiving an location indication that comprises a location reconfiguration from a host. Thus, the network node 10 is informed of location of the part that has been relocated.

Action 313. The network node 10 may then reconfigure, i.e. send reconfiguration data, one or more monitoring sessions taking the indication, such as stop request, into account or the identified change.

Figure 4:
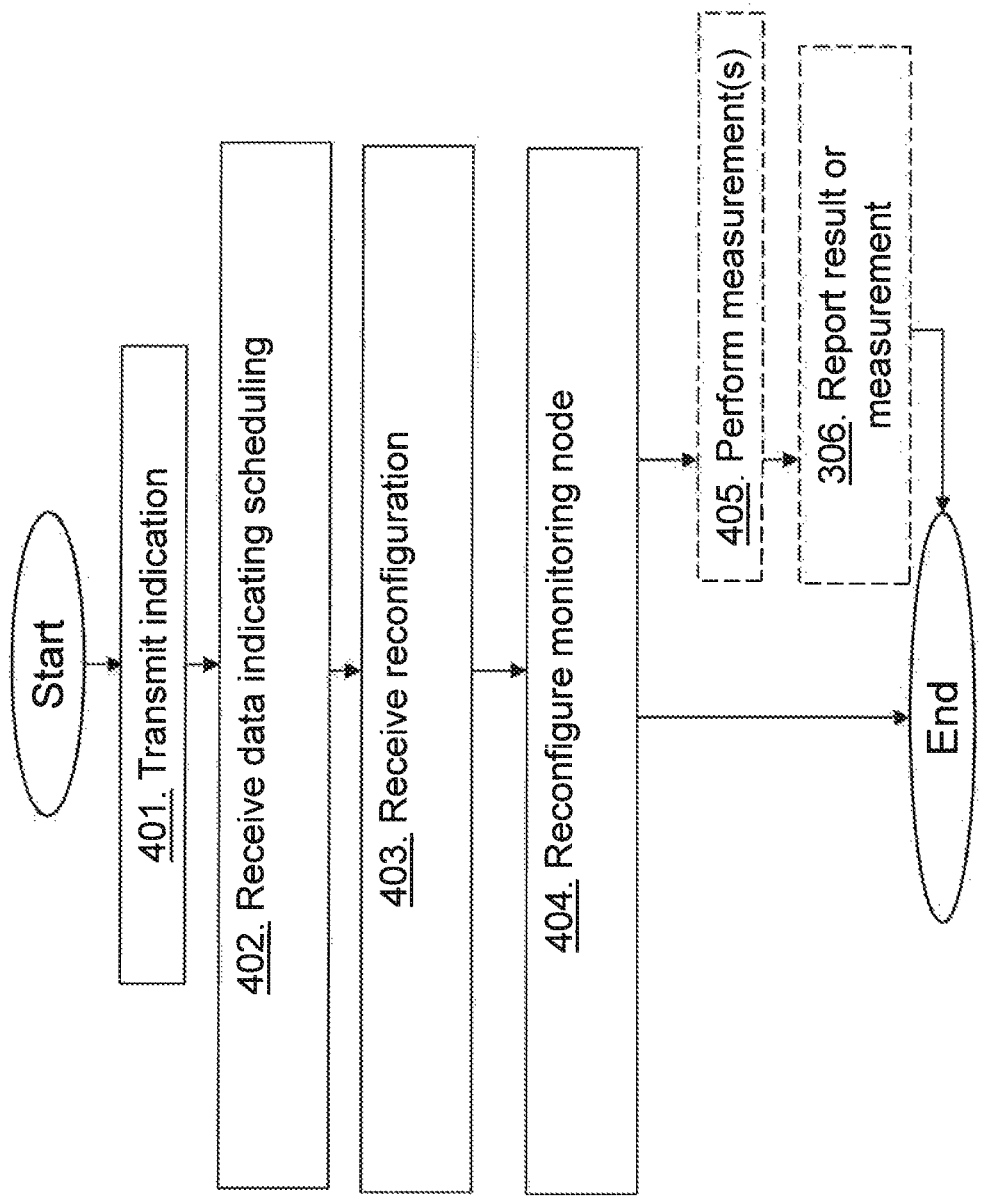
FIG. 4 shows a method performed by a monitoring node according to embodiments herein.

The method actions performed by the monitoring node for handling monitoring of applications and/or services in the communication network 1 according to some embodiments will now be described with reference to a flowchart depicted in FIG. 4. The actions do not have to be taken in the order stated below, but may be taken in any suitable order. Actions performed in some embodiments are marked with dashed boxes.

Action 401. The monitoring node transmits the indication associated with the monitoring session to monitor the metric of the service and/or application.

Action 402. The monitoring node receives, from the network node, data indicating scheduling, in frequency and/or phase, for performing one or more measurements.

Action 403. The monitoring node receives, from the network node, reconfiguration data for performing one or more measurements.

Action 404. The monitoring node reconfigures the monitoring node based on the received reconfiguration data.

Action 405. The monitoring node may perform one or more measurements as reconfigured. E.g. the monitoring node may perform measurements as scheduled.

Action 406. The monitoring node may further report, to the network node, result and/or measurement. The monitoring node may in some embodiments calculate the result based on time stamps of packets transmitted over the monitored link, or may just forward the results of the transmitted monitoring packets.

Figure 5:
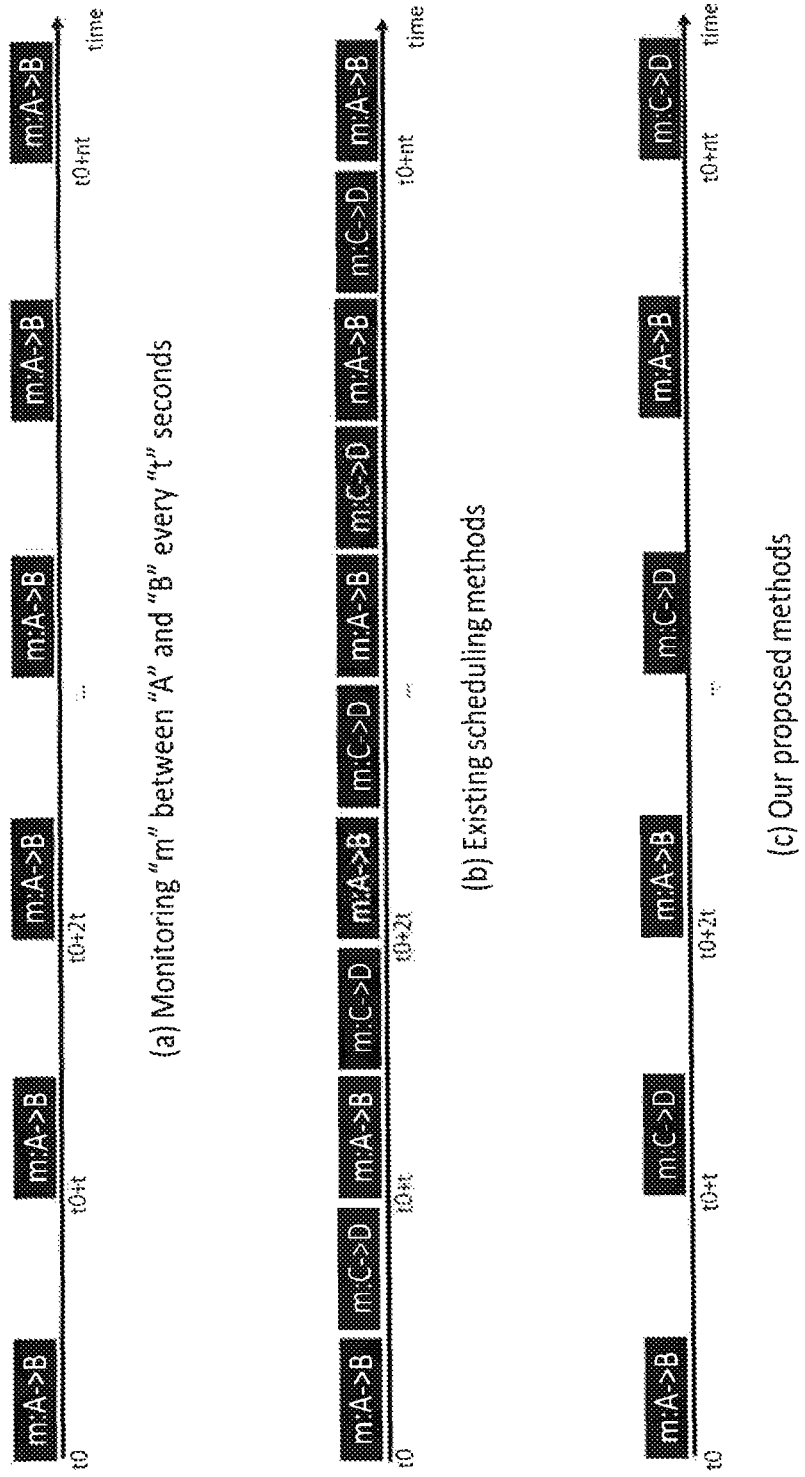
FIG. 5 shows a schematic overview depicting a scheduling according to embodiments herein.

FIG. 5 shows a schematic overview depicting a scheduling according to an example of an embodiment herein.

The network node 10 receives a monitoring request for measurements between devices "A" and "B" for metric "throughput" every "10" seconds.

```
measurement {
  m1 = throughput(A, B, 10s);
}
```

The network node 10 identifies if the same metric has already been measured between the same locations. For example, for all the monitoring requests, if metric being monitored is equal to "throughput", then compare the location of the end-points of the measurements. If the endpoints are located on the same hosts and on the same network interfaces, then it marks the monitoring requests as identical.

If this metric is not already being monitored and the overhead of the requested monitoring task does not exceed the available resources for monitoring, the network node may configure the requested monitoring functionality and collect and report metric "m1" every "10" seconds to the requesting party.

The network node 10 receives a new request from the same monitoring node or another for monitoring the same metric "throughput" between "C" and "D" every "10" seconds.

```
measurement {
    m2 = throughput(C, D, 10s);
}
```

The network node 10 may schedule the measurements as shown in FIG. 5(*b*) to avoid interference of measurements. However, the network node 10 may check ongoing monitoring sessions and identify that this monitoring request is identical to the ongoing monitoring between "A" and "B" since "A" and "C" are located on the same server and connected to a same virtual switch, and "B" and "D" are also placed on the same server with same virtual switch.

The network node 10 may then (re-)configure the monitoring sessions so that the overall monitoring overhead does not exceed the limited available resources for monitoring. The scheduling can be done using for example the method in US 20090111382 A1. The network node 10 may re-configures the measurements between "A" and "B" to be performed every "20" seconds starting from a given start time, and configures measurements between "C" and "D" to also be performed every "20" seconds starting "10" seconds after the start of measurements between "A" and "B". In this way, metric "throughput" is monitored every "10" seconds by either "A" and "B" or "C" and "D" see FIG. 5(*c*).

```
measurement {
    m1 = throughput(A, B, 20s);
}
measurement {
    m2 = throughput(C, D, 20s);
}
```

The network node 10 then receives the monitoring results for metric "throughput" every "10" seconds (one from each user every "20" seconds). The monitoring system normalizes the results (if needed) and reports metric to both requesting parties every "10" seconds, regardless of which user's monitoring function measured the metric.

If there is any change in the placement of devices, the network node 10 adapts the monitoring configurations. For example, if "A" is migrated, the monitoring system has to re-configure measurements between "A" and "B" according to the new location for "A" according to its original intents. Additionally, the monitoring system re-configures the measurements between "C" and "D" so that the original requested one measurement per "10" seconds can be provided.

Another example where this method can be used is for measuring the response time of a service. If "A" and "C" are both using the service "E", e.g. a database, then the measurements can be scheduled in order to avoid overloading resources of "E".

In view (a) a monitoring of metric m between devices A and B is measured every t second. In view (b) a monitoring of metric m between devices A and B is measured every t second and multiplex with a monitoring of metric m between devices C and D in every t second. According to embodiments herein the network node 10 may upon identifying the monitoring sessions as identical the network node 10 may reschedule the measurements and thus measure the metric m every t second but between different pairs of devices.

It should further be understood that one may add data indicating when the measurement should start e.g. 10*s*. This may be exemplified as following:

```
measurement {
    m1 = throughput(A, B, (20s, [initial_phase=10s]));
}
```

Figure 6:
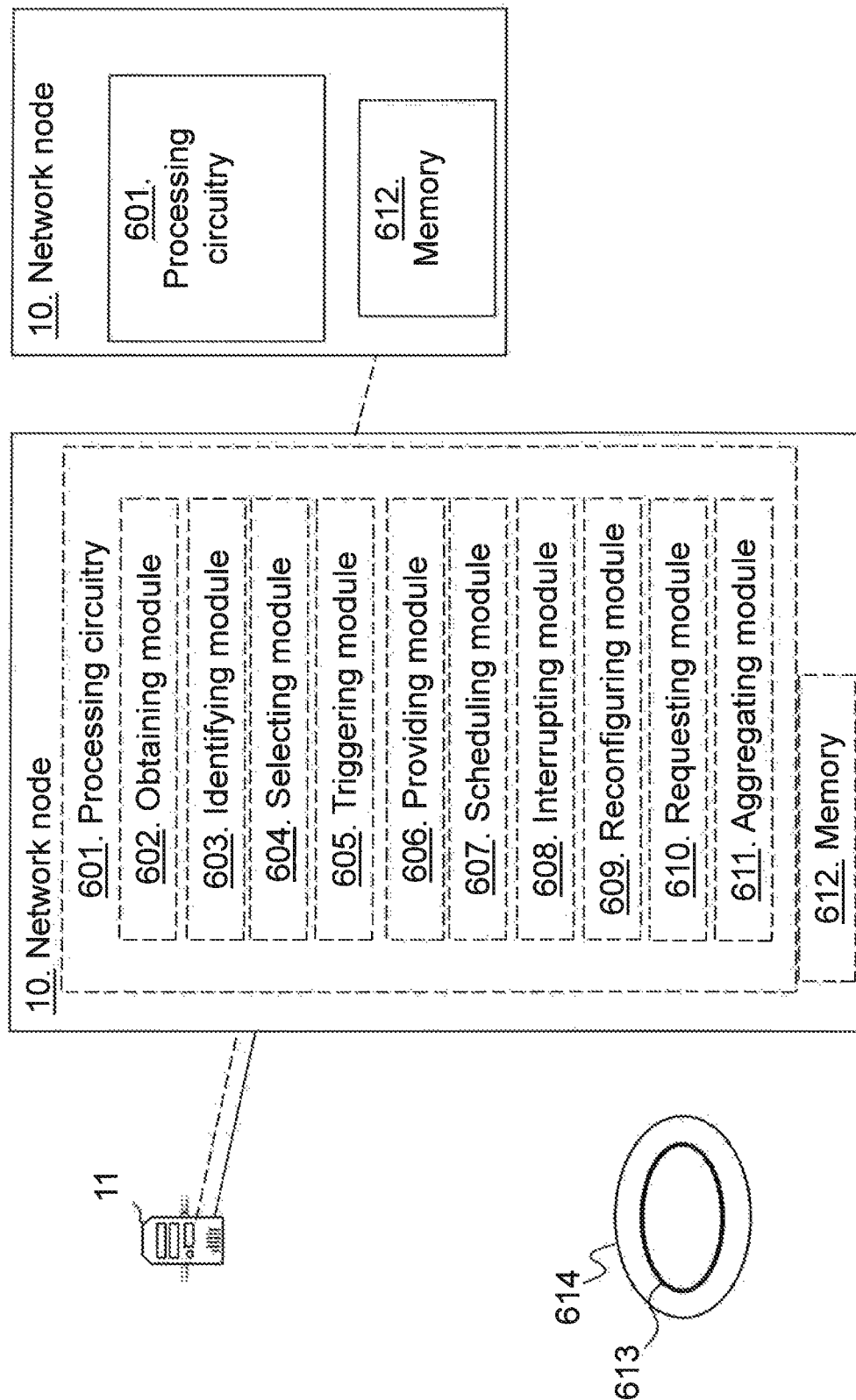
FIG. 6 is a block diagram depicting a network node according to an embodiment herein.

FIG. 6 shows a block diagram of the network node 10, in two exemplified embodiments, for handling monitoring of applications and/or services in a communication network according to embodiments herein.

The network node 10 may comprise a processing circuitry 601, e.g. one or more processors, configured to perform the methods herein.

The network node 10 may comprise an obtaining module 602, e.g. a receiver or a transceiver. The network node 10, the processing circuitry 601, and/or the obtaining module 602 is configured to obtain the indication associated with the monitoring session to monitor the metric of the service and/or application. The network node 10, the processing circuitry 601, and/or the obtaining module 602 is further configured to obtain the location of deployment of the service and/or application. The indication may comprise: a request for monitoring the metric of the service and/or application; a stop request; or a location reconfiguration.

The network node 10 may comprise an identifying module 603. The network node 10, the processing circuitry 601, and/or the identifying module 603 is configured to identify the one or more ongoing monitoring sessions for monitoring one or more metrics based on the metric associated with the indication and the location of deployment of the application or service.

The network node 10 may comprise a selecting module 604. The network node 10, the processing circuitry 601, and/or the selecting module 604 is configured to select the monitoring process based on the identification. It should here be noted that the network node may select a number of monitoring processes based on the identification.

The network node 10 may comprise a triggering module 605. The network node 10, the processing circuitry 601, and/or the triggering module 605 is configured to trigger the selected monitoring process.

The network node 10 may comprise a providing module 606, e.g. a transmitter or transceiver. The network node 10, the processing circuitry 601, and/or the providing module 606 may be configured to provide one or more results of the one or more ongoing monitoring sessions to the party requesting the monitoring of the metric of the service and/or application.

The network node 10 may comprise a scheduling module 607. The network node 10, the processing circuitry 601, and/or the scheduling module 607 may be configured to schedule, in frequency and/or phase, one or more measurements of the identified one or more ongoing monitoring sessions taking resource limitations into account.

The network node 10, the processing circuitry 601, and/or the obtaining module 602 may then be further configured to obtain the one or more results of the one or more measurements performed as scheduled. The network node 10, the processing circuitry 601, and/or the providing module 606 may be configured to report the obtained one or more results to the monitoring session and the identified one or more ongoing monitoring sessions.

The network node 10 may comprise an interrupting module 608. The network node 10, the processing circuitry 601, and/or the interrupting module 608 may be configured to interrupt provision of one or more results of the one or more ongoing monitoring sessions based on the stop request, i.e. when the indication is the stop request. It should further be noted that the network node 10, the processing circuitry 601, and/or the interrupting module 608 may be configured to interrupt provision of one or more results in case a reconfiguration or rescheduling of the measurements may be performed.

The network node 10, the processing circuitry 601, and/or the identifying module 603 may be configured to identify a change in a monitoring session. For example, the location of deployment may change or similar.

The network node 10 may comprise a reconfiguring module 609. The network node 10, the processing circuitry 601, and/or the reconfiguring module 609 may be configured to reconfigure one or more monitoring sessions taking the indication into account or the identified change.

The network node 10 may comprise a requesting module 610. The network node 10, the processing circuitry 601, and/or the requesting module 610 may be configured to request the location of deployment of the application or service from a cloud orchestrator. This may e.g. be triggered upon initiation of a monitoring session or a relocation of deployment of an application or service.

The network node 10 may comprise an aggregating module 611. The network node 10, the processing circuitry 601, and/or the aggregating module 611 may be configured to aggregate the one or more results.

The network node 10 further comprises a memory 612 comprising one or more memory units. The memory 612 comprises instructions executable by the processing circuitry 601 to perform the methods herein when being executed in the network node 10. The memory 612 is arranged to be used to store e.g. information, data such as monitoring information, measurements, results, locations, metrics, etc.

The methods according to the embodiments described herein for the network node 10 are respectively implemented by means of e.g. a computer program 613 or a computer program product, comprising instructions, i.e., software code portions, which, when executed on at least one processor, cause the at least one processor to carry out the actions described herein, as performed by the network node 10. The computer program 613 may be stored on a computer-readable storage medium 614, e.g. a disc, a USB, or similar. The computer-readable storage medium 614, having stored thereon the computer program, may comprise the instructions which, when executed on at least one processor, cause the at least one processor to carry out the actions described herein, as performed by the network node 10. In some embodiments, the computer-readable storage medium may be a non-transitory computer-readable storage medium. Thus, the network node 10 may comprise the processing circuitry and the memory, said memory comprising instructions executable by said processing circuitry whereby said network node is operative to perform the methods herein.

Figure 7:
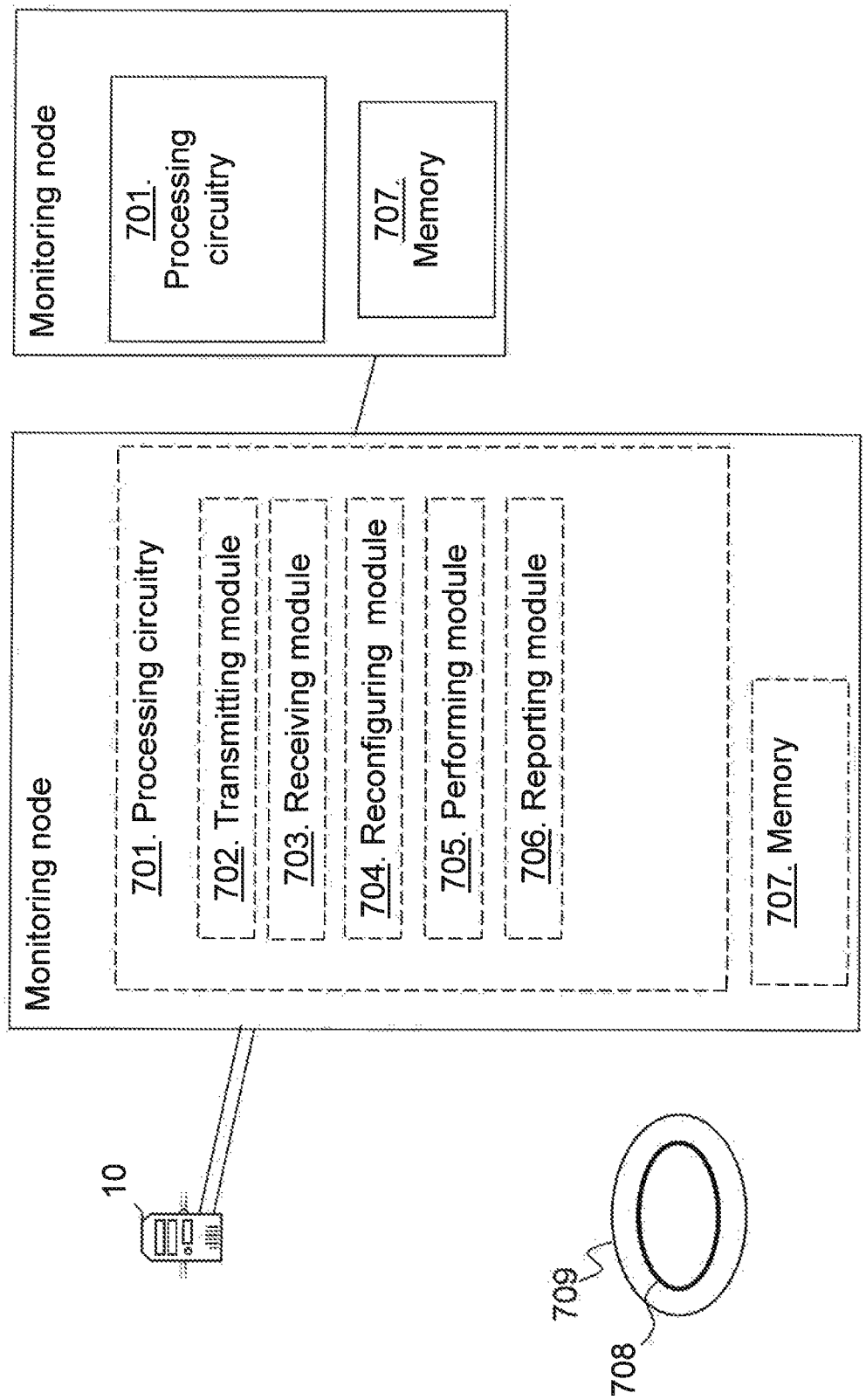
FIG. 7 is a block diagram depicting a monitoring node according to an embodiment herein.

FIG. 7 shows a block diagram of the monitoring node, in two exemplified embodiments, for handling monitoring of applications and/or services in the communication network according to embodiments herein.

The monitoring node may comprise a processing circuitry 701, e.g. one or more processors, configured to perform the methods herein.

The monitoring node may comprise a transmitting module 702, e.g. a transmitter or a transceiver. The monitoring node, the processing circuitry 701, and/or the transmitting module 702 is configured to transmit, to the network node 10, the indication associated with the monitoring session to monitor the metric of the service and/or application.

The monitoring node may comprise a receiving module 703, e.g. a receiver or a transceiver. The monitoring node, the processing circuitry 701, and/or the receiving module 703 is configured to receive, from the network node 10, data indicating scheduling, in frequency and/or phase, for performing one or more measurements. The monitoring node, the processing circuitry 701, and/or the receiving module 703 is further configured to receive, from the network node 10, reconfiguration data for performing one or more measurements.

The monitoring node may comprise a reconfiguring module 704. The monitoring node, the processing circuitry 701, and/or the reconfiguring module 704 is configured to reconfigure the monitoring node based on the received reconfiguration data.

The monitoring node may comprise a performing module 705. The monitoring node, the processing circuitry 701, and/or the performing module 705, such as a measurement handler, may be configured to perform one or more measurements as reconfigured.

The monitoring node may comprise a reporting module 706. The monitoring node, the processing circuitry 701, and/or the reporting module 706 may be configured to report, to the network node, result and/or measurement.

The monitoring node further comprises a memory 707 comprising one or more memory units. The memory 707 comprises instructions executable by the processing circuitry 701 to perform the methods herein when being executed in the monitoring node. The memory 707 is arranged to be used to store e.g. information, data such as monitoring information, measurements, results, locations, metrics, etc.

The methods according to the embodiments described herein for the monitoring node are respectively implemented by means of e.g. a computer program 708 or a computer program product, comprising instructions, i.e., software code portions, which, when executed on at least one processor, cause the at least one processor to carry out the actions described herein, as performed by the monitoring node. The computer program 708 may be stored on a computer-readable storage medium 709, e.g. a disc, a USB, or similar. The computer-readable storage medium 709, having stored thereon the computer program, may comprise the instructions which, when executed on at least one processor, cause the at least one processor to carry out the actions described herein, as performed by the monitoring node. In some embodiments, the computer-readable storage medium may be a non-transitory computer-readable storage medium. Thus, the monitoring node may comprise the processing circuitry and the memory, said memory comprising instructions executable by said processing circuitry whereby said monitoring node is operative to perform the methods herein.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a network node for handling monitoring of applications in a communication network, the method comprising:
    obtaining, at the network node, an indication associated with a monitoring session, wherein the indication is an indication to monitor a metric of an application;
    obtaining, at the network node, a location of deployment of the application;
    identifying one or more ongoing monitoring sessions for monitoring one or more metrics of the application based on the metric associated with the indication and the location of deployment of the application;
    selecting a monitoring process based on the identification; and
    triggering the selected monitoring process.

2. The method according to claim 1, wherein the indication comprises a request for monitoring the metric of the application.

3. The method according to claim 2, wherein the monitoring process comprises:
    providing one or more results of the one or more ongoing monitoring sessions to a party requesting the monitoring of the metric of the application.

4. The method according to claim 3, wherein the monitoring process comprises:
    scheduling, in frequency and/or phase, one or more measurements of the identified one or more ongoing monitoring sessions taking resource limitations into account; and
    obtaining one or more results of the one or more measurements performed as scheduled;
    wherein providing the one or more results comprises reporting the obtained one or more results to the monitoring session and the identified one or more ongoing monitoring sessions.

5. The method according to claim 4, wherein the indication comprises a stop request and wherein the monitoring process comprises interrupting provision of one or more results of the one or more ongoing monitoring sessions based on the stop request.

6. The method according to claim 4, wherein the monitoring process comprises:
    reconfiguring one or more monitoring sessions taking the indication into account or an identified change.

7. The method according to claim 1, further comprising:
    identifying a change in a monitoring session.

8. The method according to claim 1, comprising:
    requesting the location of deployment of the application from a cloud orchestrator.

9. A monitoring node for handling monitoring of applications in a communication network, the monitoring node comprising a CPU coupled to a memory, the monitoring node being configured to:
    transmit, to a network node, an indication associated with a monitoring session, wherein the indication is an indication to monitor a metric of an application;
    receive, from the network node, data indicating scheduling, in frequency and/or phase, for performing one or more measurements of the application;
    receiving, from the network node, reconfiguration data for performing one or more measurements of the application; and
    reconfigure the monitoring node based on the received reconfiguration data.

10. The monitoring node according to claim 9, further being configured to:
    perform one or more measurements as reconfigured; and
    report, to the network node, result and/or measurement.

11. A method performed by a monitoring node for handling monitoring of applications in a communication network, the method comprising:
    transmitting, to a network node, an indication associated with a monitoring session, wherein the indication is an indication to monitor a metric of an application;
    receiving, from the network node, data indicating scheduling, in frequency and/or phase, for performing one or more measurements;
    receiving, from the network node, reconfiguration data for performing one or more measurements; and
    reconfiguring the monitoring node based on the received reconfiguration data.

12. A computer program product comprising a non-transitory computer-readable storage medium, having stored thereon a computer program comprising instructions which, when executed on at least one processor, cause the at least one processor to carry out the method according to claim 1, as performed by the network node or a monitoring node.

13. A network node for handling monitoring of applications in a communication network, the network node comprising a CPU coupled to a memory, the network node being configured to:
    obtain, at the network node, an indication associated with a monitoring session, wherein the indication is an indication to monitor a metric of an application;
    obtain, at the network node, a location of deployment of the application;
    identify one or more ongoing monitoring sessions for monitoring one or more metrics of the application based on the metric associated with the indication and the location of deployment of the application;
    select a monitoring process based on the identification; and
    trigger the selected monitoring process.

14. The network node according to claim 13, wherein the indication comprises a request for monitoring the metric of the application.

15. The network node according to claim 14, further being configured to provide one or more results of the one or more ongoing monitoring sessions to a party requesting the monitoring of the metric of the application.

16. The network node according to claim 15, further being configured to:
- schedule, in frequency and/or phase, one or more measurements of the identified one or more ongoing monitoring sessions taking resource limitations into account;
- obtain one or more results of the one or more measurements performed as scheduled; and
- report the obtained one or more results to the monitoring session and the identified one or more ongoing monitoring sessions.

17. The network node according to claim 13, further being configured to:
- request the location of deployment of the application from a cloud orchestrator.

18. The network node according to claim 16, wherein the indication comprises a stop request and wherein the network node is further configured to:
- interrupt provision of one or more results of the one or more ongoing monitoring sessions based on the stop request.

19. The network node according to claim 13, further being configured to:
- identify a change in a monitoring session.

20. The network node according to claim 18, being configured to:
- reconfigure one or more monitoring sessions taking the indication into account or an identified change.

* * * * *